(12) United States Patent
Bussinger

(10) Patent No.: US 6,273,206 B1
(45) Date of Patent: Aug. 14, 2001

(54) DEMOUNTABLE MOTOR DRIVEN VEHICLES FOR THE PHYSICALLY CHALLENGED

(75) Inventor: Allen Bussinger, Saginaw, MI (US)

(73) Assignee: Amigo Mobility International, Inc., Bridgeport, MI (US)

( * ) Notice: Subject to any disclaimer, the term of this patent is extended or adjusted under 35 U.S.C. 154(b) by 0 days.

(21) Appl. No.: 09/500,183

(22) Filed: Feb. 7, 2000

Related U.S. Application Data
(60) Provisional application No. 60/119,558, filed on Feb. 10, 1999.

(51) Int. Cl.$^7$ .................................................. B62D 61/00
(52) U.S. Cl. ......................... 180/208; 180/210; 180/211; 180/907
(58) Field of Search .................................. 180/211, 208, 180/216, 907, 210; 280/287, 278, DIG. 5

(56) References Cited

U.S. PATENT DOCUMENTS

| | | |
|---|---|---|
| 3,108,481 | 10/1963 | Westmont . |
| 3,249,171 | 5/1966 | Kinghorn . |
| 3,388,761 | 6/1968 | Arpin . |
| 3,605,929 | 9/1971 | Rolland . |
| 4,570,739 | 2/1986 | Kramer . |
| 4,892,166 * | 1/1990 | Gaffney ............................... 180/208 |
| 4,944,359 * | 7/1990 | Doman et al. ....................... 180/208 |
| 4,947,955 * | 8/1990 | Hopely Jr. ........................... 180/216 |
| 5,020,624 * | 6/1991 | Nesterick et al. ................... 180/210 |
| 5,074,372 * | 12/1991 | Schepis ............................... 180/208 |
| 5,154,251 * | 10/1992 | Fought ................................ 180/208 |
| 5,238,082 * | 8/1993 | Stegeman et al. ................... 180/208 |
| 5,333,702 * | 8/1994 | Gaffney et al. ...................... 180/208 |
| 5,388,659 * | 2/1995 | Pepe .................................... 180/219 |
| 5,695,021 * | 12/1997 | Schaffner et al. ................... 180/208 |
| 6,056,077 * | 5/2000 | Kobayashi ........................... 180/216 |
| 6,170,592 * | 1/2001 | Wu ...................................... 180/208 |
| 6,176,337 * | 1/2001 | McConnell et al. ................. 180/208 |

OTHER PUBLICATIONS

Amigo Brochure a Revolutionary Concept in Wheelchair Design 5 pages.
Health Aid Services, Inc. A–Bec SCOOTA pamphlet 2 pages.
E.F. Brewer Company PORTASCOOT pamphlet 4 pp.
E.F. Brewer Company PORTASCOOT The Alternative pamphlet 4 pages.
Voyager Inc. VOYAGER II (prior art) 5 pages.
Voyager Inc. VOYAGER IV (prior art) 4 pages.
Voyager Inc. VOYAGER VI (prior art) 4 pages.

\* cited by examiner

Primary Examiner—Brian L. Johnson
Assistant Examiner—Deanna L. Draper
(74) Attorney, Agent, or Firm—Reising, Ethington, Barnes, Kisselle, Learman & McCulloch, P.C.

(57) ABSTRACT

A motor driven demountable chair vehicle has a frame supported on front and rear wheels. A steering column is mounted on the front end of the frame and a seat is supported rearwardly thereof. The frame has discrete front and rear segments incorporating a longitudinally telescopic coupling assembly comprising a longitudinal telescoping part on one of the segments received by a receiving part on the other segment, and a latch assembly connected with one of the parts and automatically interacting with the other upon relative telescoping movement of the parts latches them in locked position.

11 Claims, 5 Drawing Sheets

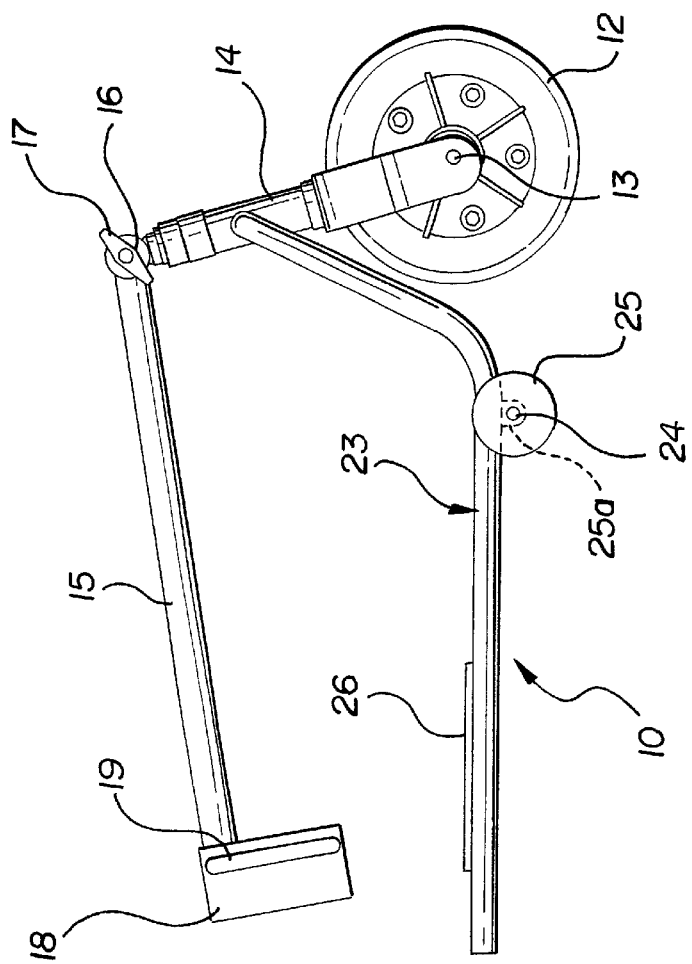
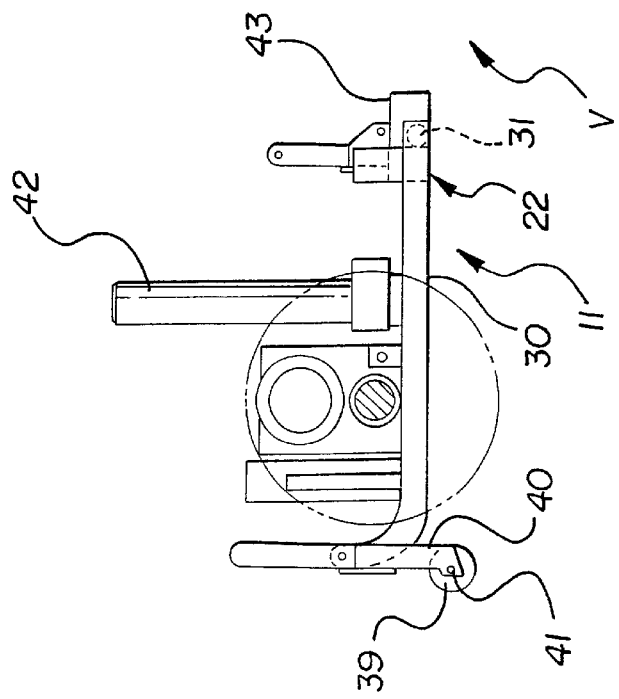
FIG-3

DEMOUNTABLE MOTOR DRIVEN VEHICLES FOR THE PHYSICALLY CHALLENGED

BACKGROUND OF THE INVENTION

This invention claims the priority of provisional application 60/119,558 filed Feb. 10, 1999 and relates to dismountable vehicles of the open type used by the physically challenged wherein a front steerable wheel has a steering column with handlebars or the like forwardly adjacent a seat, and a battery system is carried for powering an electric drive motor system for driving the vehicle wheels. Such vehicles normally have a floor pan on which the seat occupant's feet rest. As disclosed in the Kramer U.S. Pat. No. 4,570,739, which I incorporate herein by reference, it has been proposed to provide disengageable front and rear sections for the vehicle's longitudinal frame, along with disengaging capability for some other parts of the vehicle, to enable the vehicle to be transported and stored more readily.

SUMMARY OF THE INVENTION

One of the prime objects of the present invention is to provide a relatively narrow lightweight vehicle of the foregoing character with an automatically locking frame assembly which is activated automatically when the front and rear frame sections are telescopically engaged.

Another object of the invention is to provide an assembly of this type wherein a lever latch, normally maintained in the path of movement of one of the vehicle frame sections, is longitudinally displaced upon relative telescopic movement of the sections to enable the frame sections to be moved into a latching position.

Still another object of the invention is to provide an assembly of this character wherein the lever latch can be rapidly and easily operated by the physically challenged to delatch the sections and permit their relative longitudinal separation.

Another object of the invention is to provide an assembly of this type which is relatively simple in construction and, accordingly, inexpensive to manufacture.

A further object of the invention is to provide a vehicle assembly of this type which is durable and stable, and enhances the safety of operation of the vehicle.

The invention contemplates a dismountable powered vehicle for the physically challenged comprising:

a. a frame having a longitudinally extending floor frame supported on front and rear wheels;
 b. a generally vertically extending steering column mounted on the front end of the floor frame and connected to steer the vehicle;
 c. a seat supported by the floor frame rearwardly of the steering column;
 d. a motor connected to drive the wheels selectively to move the vehicle forwardly or rearwardly;
 e. the floor frame having discrete front and rear segments including a longitudinally telescopic coupling assembly comprising a longitudinal part on one of the segments received within a tubular part on the other segment; and
 f. a lever latch connected with one of the parts automatically interacting with the other of the parts upon movement of the parts relatively longitudinally for latching them in locked position.

Other objects and advantages of the invention will become apparent with reference to the accompanying drawings and the accompanying descriptive matter.

THE DRAWINGS

The presently preferred embodiment of the invention is disclosed in the following description and in the accompanying drawings, wherein:

FIG. 3 is a schematic side elevational view of the disassembled parts of the vehicle with certain parts being eliminated from the view in the interest of clarity;

GENERAL DESCRIPTION

Referring now more particularly to the accompanying drawings, the vehicle, generally indicated by the letter V, includes discrete front and rear segments, portions, sections or units generally indicated at 10 and 11 in FIG. 3, for example. The front portion 10 includes a front wheel 12 journaled on wheel axle 13 which is carried on a wheel fork and steering column or tiller support 14. While axle 13 is shown as a non-driven axle, a motor connected to batteries could be mounted in position to convert axle 13 to a live axle.

Figure 1:
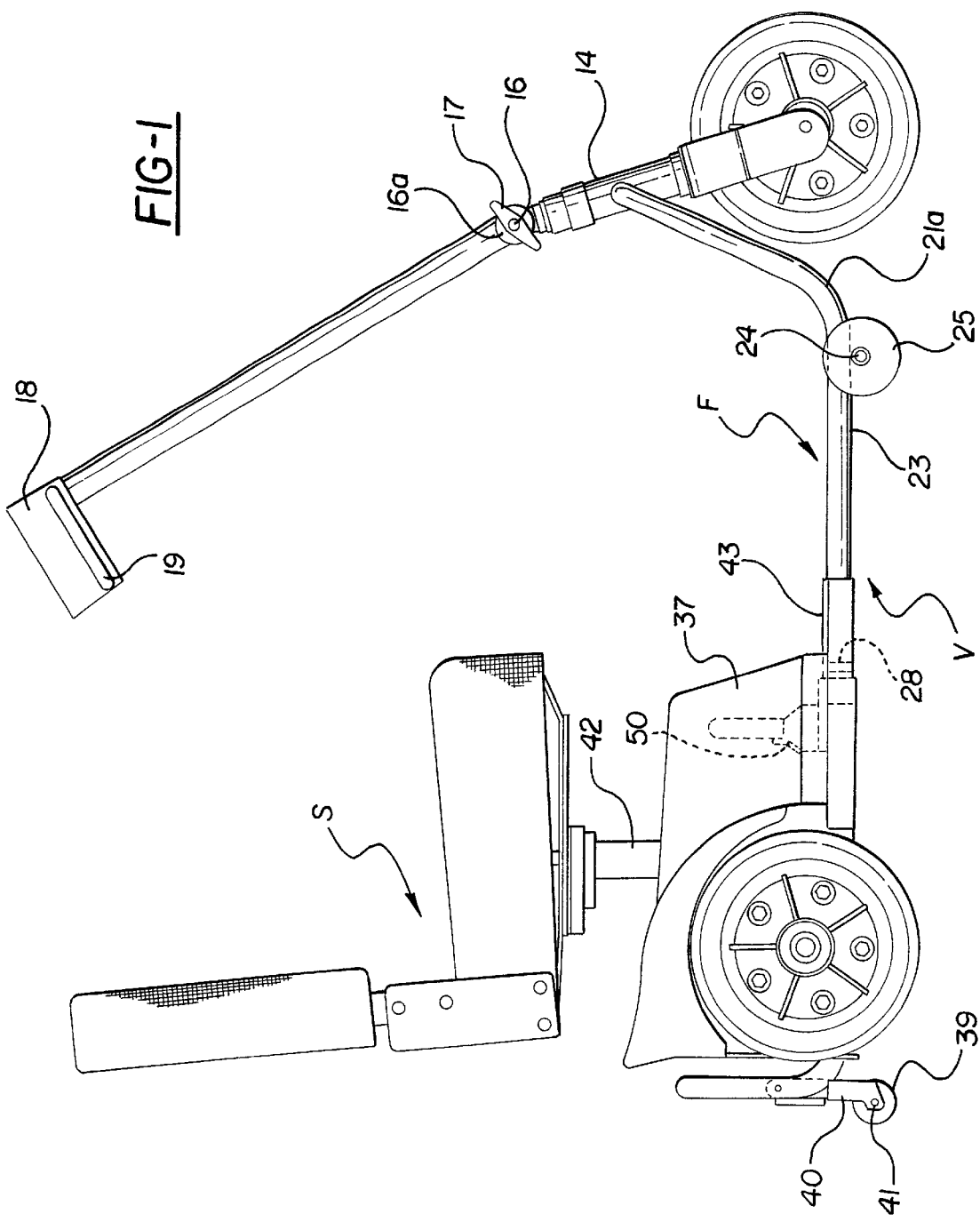
FIG. 1 is a schematic side elevational view of the assembled vehicle.

The steering column 15 may be pivotally mounted at 16 on a ring part 16a carried on support 14 for swinging movement from the position shown in FIG. 1 to the position shown in FIG. 3, and can be locked in either position by manipulating handle 17. Alternatively, the column 15 could be mounted for disengagement from the support assembly 14 with suitable provision for disconnecting the motor controls carried on the upper end of column 15 in a controls casing 18 between steering handle bars 19. Battery powered drive manipulating speed and direction control levers are shown at 20.

The overall support frame or floor frame, generally designated F, includes separable front and rear sections, generally designated 21 and 22 respectively. Front section 21, which rigidly includes support assembly 14, is U-shaped, with rearwardly extending legs 21a mounting a floor pan 23 on which the vehicle occupants' feet can rest when the occupant is seated on the seat S carried by the rear frame section or assembly 22. Axle shaft ends 24, journaling lateral stability wheels 25, can be carried by a tubular cross member 25a.

Projecting rearwardly from the floor pan 23 and front frame assembly 21, of which it is a part, is a tubular sleeve member 26. The tubular member or sleeve 26, integrated with the front platform section 10, extends through a slot 27 provided in floor pan 23 as shown in FIG. 4, and may be rigidly fixed to a brace member 28 joining legs 21a.

The rear segment or section 11 of the vehicle V, has a frame part or assembly generally designated 29, including longitudinally extending side members 30 joined at front and rear ends by members 31 and 32, respectively. Bearings 33 support a live axle or drive shaft 34, on which the driven rear wheels 35 are fixed. The shaft assembly 34 may be efficiently driven by a drive unit 36, having one or more electric drive motors, which is mounted on the frame 29 and connected with batteries contained in suitable battery covers 37. Controller assembly 38, which spans the frame parts 30, is provided for controlling the drive unit 36.

As FIG. 3 indicates, rear stability wheels 39 can be mounted on wheel supporting brackets 40 on stub axles 41 provided thereon in the usual manner. Centrally mounted on the rear frame 29 is the seat S on a seat post 42 carried on a frame platform 42a. Fixed in a central position on the frame part 31 forwardly of post 42 is a sleeve 43 of a size, and in position, to telescopically receive the male sleeve 26. The tube 43 has a slot 43a in which the locking tooth 44a of a locking lever 45 is normally received. It will be observed that the locking lever 45 is pivotally mounted at 46 on brackets 47 fixed on tube 43, and that the locking tooth 44a has an inclined cam surface 48. An abutment strap 49, fixed to the brackets 47, has a spring seat 49a for a coil spring 50 which also mounts on a spring seat 51 provided on the lever 45.

Figure 4:
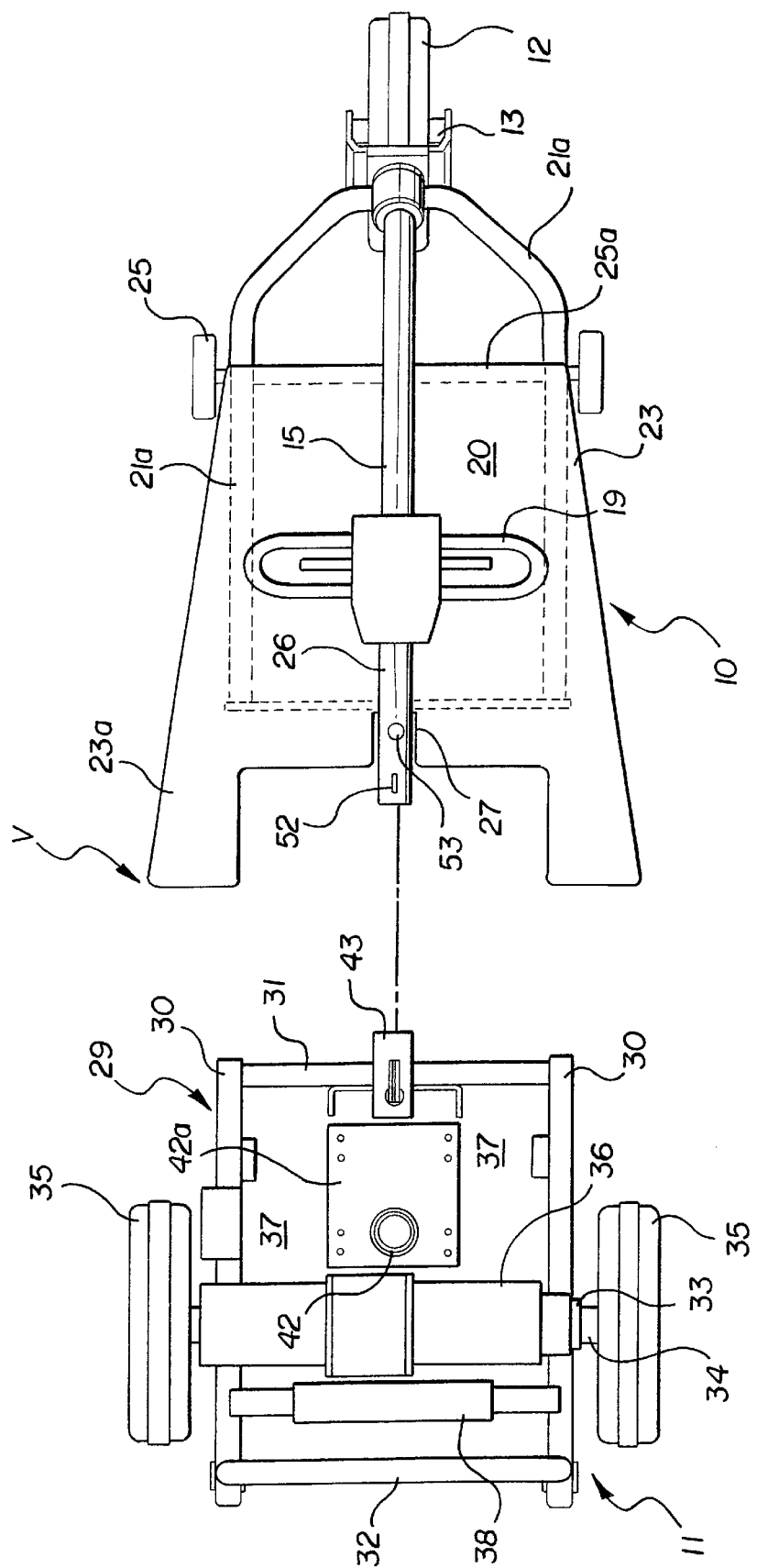
FIG. 4 is a top plan view thereof, with the steering column in raised position, however.
Figure 6:
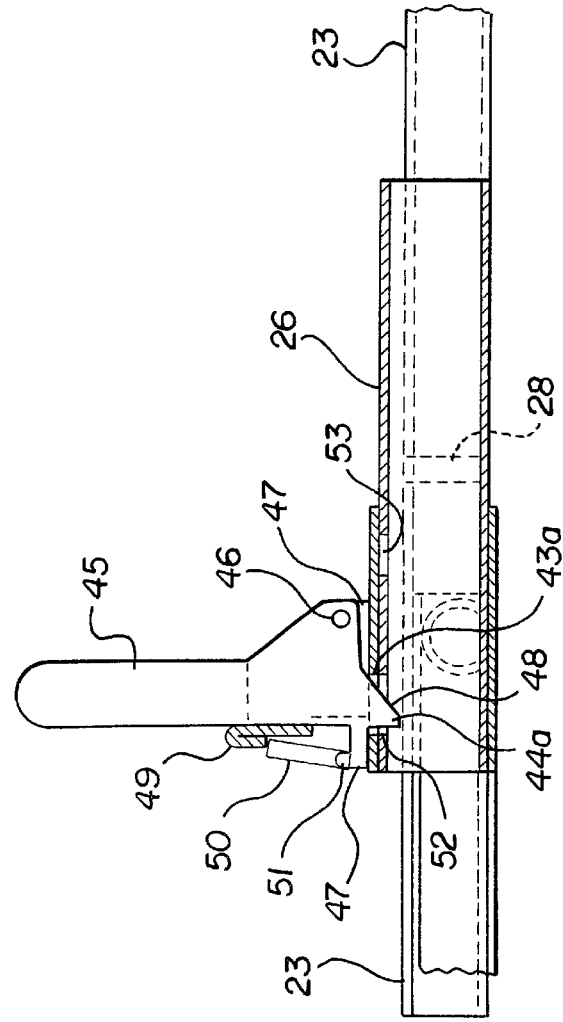
FIG. 6 is a similar view showing them in locked position.

As FIG. 4 indicates, the male part 26 has a slot 52 corresponding to the slot 43a and, in addition, an indicating opening 53 spaced forwardly thereof. In the FIG. 6 position in which the locking tooth 48 is disposed in locking position extending through both the slots 43a and 52, the visible indicating opening 53 is hidden within the sleeve 43. To achieve a tolerance fit between the sleeves 26 and 43, so that part seizure does not prevent easy disassembly, there is normally a 40,000ths clearance between the parts 26 and 43. Moreover, and again, for ease of operation, a lash of about 1/16 of an inch is provided for the locking tooth 44a when it is disposed in the locking position within slots 43a and 52.

The Operation

Figure 5:
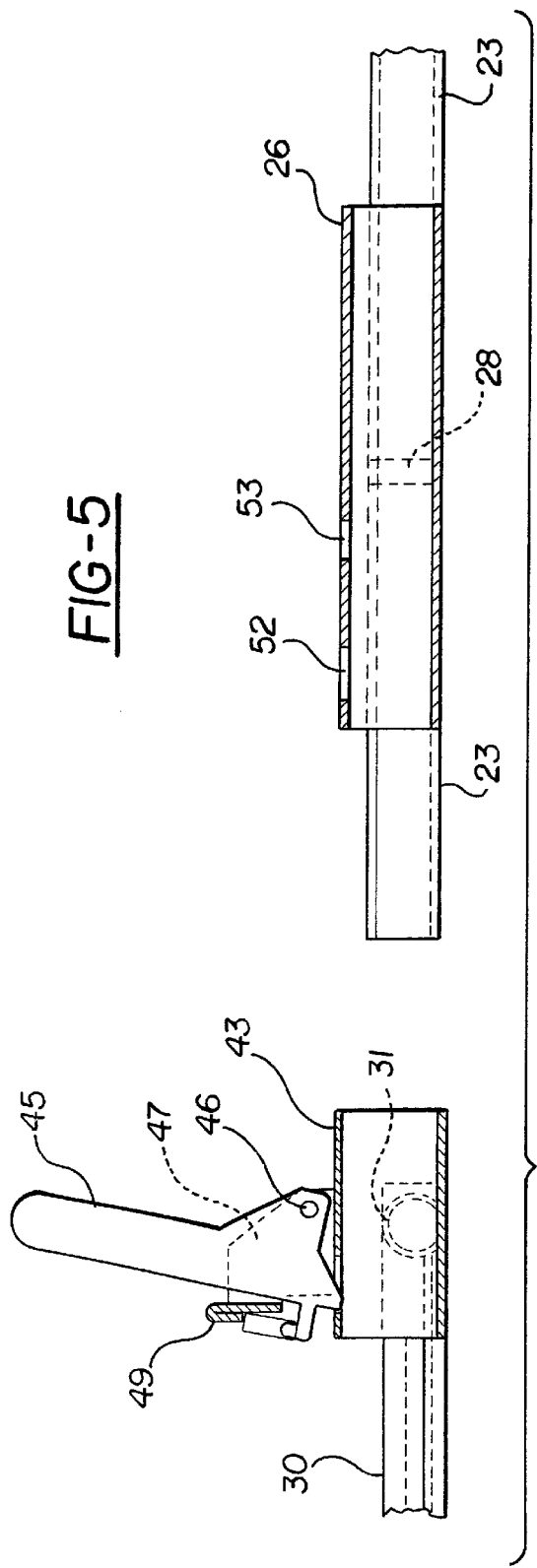
FIG. 5 is an enlarged, fragmentary side elevational view of the front and rear frame segments, shown in released position.

In operation, assuming the vehicle is in the disengaged position shown in FIGS. 3–5, and lever 45 is in the vertical position with tooth 44a extending into the slot 52 in sleeve 43, it is only necessary to move the front and rear portions of the vehicle telescopically longitudinally together to move the male sleeve 26 into the female sleeve 43, and to then move the parts further together in order to effect automatic locking in an easy manner which can be achieved readily by a handicapped person. When the rear end of sleeve 26 strikes the cam surface 48, the lever 45 is pivoted in a clockwise direction about pivot pin 46 in FIG. 6 to remove the locking tooth 44a upwardly, so that the sleeve 26 can slide to the position shown in FIG. 6.

Figure 2:
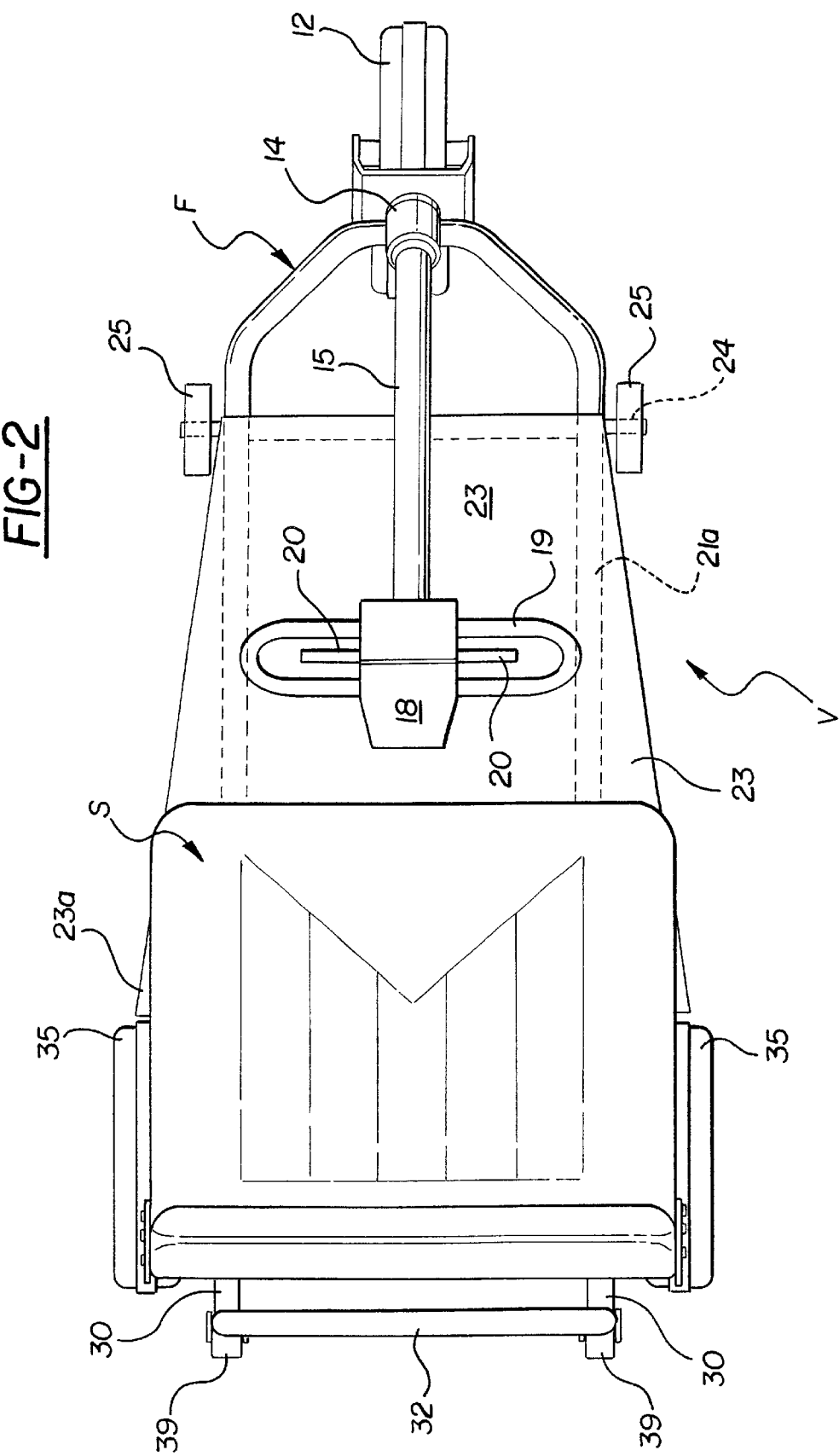
FIG. 2 is a top plan view thereof.

The inward movement of sleeve 26 and the front end of the vehicle is halted when the sleeve 26 strikes the wall W which is a part of the rear frame assembly. When the sleeve 26 reaches this position, and slots 52 and 43a are in vertical alignment, the spring 50 restores the lever 45 to the vertical position once again, and the front and rear portions of the vehicle are securely locked without any lock manipulation being necessary. The bifurcation of the rear end of pan 23 accommodates movement of the pan to the position shown in FIG. 2 over the frame 29, with ears 23a extending rearwardly as shown.

To disengage or demount the front and rear portions 10 and 11 of the vehicle, it is merely necessary to pivot the lever 45 clockwisely to the FIG. 5 position, manually to pivot the locking tooth 44a out of the path of the marginal edges of slot 52 and pull the two portions 10 and 11 of the vehicle apart. Thence, the lever 45 automatically will be restored to its vertical position by spring 50. While shown as operating by moving forwardly, the lever 45 could also be operated by moving rearwardly. Also, the position of parts 26 and 43 could be interchanged.

Because of the play which is permitted between the parts 26, 43 and 44a, seizure of the parts is avoided, even with the grime which accumulates inevitably with continued operation of the vehicle, so that disengagement can still be effected readily by a handicapped person. It is to be understood that the disengagement of other parts is also contemplated to permit the various components to be compactly stored in the trunk of an automobile, for example.

For instance, the seat portion of seat S may be disengaged from the support post 42. The steering column 15 can be folded down to the position shown in FIG. 3 or provision made for its disengagement from column support member 14. Also, the batteries can be disconnected and removed from the battery covers 37 to considerably lighten the rear frame portion of the vehicle.

The disclosed embodiment is representative of a presently preferred form of the invention, but is intended to be illustrative rather than definitive thereof. The invention is defined in the claims.

I claim:

1. A motor driven demountable chair vehicle for the physically challenged comprising:

a. a longitudinally extending frame with front and rear ends supported on front and rear wheels;

b. a generally vertically extending steering column mounted on said front end of said frame and connected to steer the vehicle;

c. a seat supported by said frame rearwardly of said steering column;

d. a motor supported by said frame connected to drive the vehicle selectively forwardly or rearwardly;

e. said frame having discrete separable steering column and seat supporting front and rear segments including a linearly extending telescopic coupling assembly comprising a linearly horizontally longitudinally extending telescoping part on one of the segments receivable by a linearly horizontally longitudinally extending receiving part on the other of said segments;

f. said telescoping part having an opening which comes from a remote position in which said parts are disassembled into a lockable position when a predetermined relative telescoping position is reached by said telescoping part and said receiving part;

g. a latch assembly carried with one of said parts and automatically interacting with the other of said parts upon movement of said parts relatively horizontally longitudinally to telescoped position for latching said parts in locked position; and h. a swingably mounted handle for said latch assembly, with a projecting cam latch fixed thereon, mounted to swing in a path from a locking position in which movement of said handle is halted and said cam latch extends into said opening in said telescoping part to an unlocked position in which said cam latch is swung out of said opening, said cam latch having a cam face cammed by said telescoping part to swing said cam latch and said handle to the unlocked position when engaged by said telescoping part during relative movement of said parts to said telescoped position, and said handle being biased to automatically swing to said locking position.

2. The vehicle of claim 1 wherein a biasing mechanism connected to said handle urges said handle and thereby said cam latch toward said locking position.

3. The vehicle of claim 2 in which said biasing mechanism is a spring, and said coupling assembly is provided with an abutment to halt movement of said handle and prevent said handle from moving in a path past said locking position under the influence of said biasing spring.

4. The vehicle of claim 3 wherein said handle in locked position is substantially upright and is pivoted to swing about a transverse axis located vertically between said abutment and said cam latch so that movement of said telescoping part toward said remote position is prevented unless the handle is manually swung in a forward path toward said unlocked position.

5. The vehicle of claim 1 wherein said seat is mounted on a column extending upwardly on said rear frame segment and said latch assembly is disposed just forwardly thereof.

6. The vehicle of claim 1 wherein said front frame segment mounts a floor plate having a rearwardly facing recess for receiving said rear frame segment, the recess defining rearwardly projecting wings which extend substantially to said rear wheels when the frame segments are in assembled condition.

7. The vehicle of claim 6 wherein said telescoping part is on the front frame segment and comprises a projecting tube secured to said floor plate centrally and projecting a predetermined distance into said recess, and said receiving part is on said rear frame segment and comprises a receiving tube which telescopically receives said projecting tube on said front segment.

8. The vehicle of claim 7 in which said projecting tube has an upper face with a longitudinally elongate slot therein constituting said opening and said receiving tube has an upper surface with a longitudinally extending elongate slot which aligns vertically with the slot in said projecting tube when said projecting tube is received by said receiving tube.

9. The vehicle of claim 8 in which said cam latch normally extends into said slot in said receiving tube into the path of said projecting tube and is moved automatically by said projecting tube out of latching position, and then returns through said slots when said slots align to latch the tubes and frame segments.

10. The vehicle of claim 9 wherein a spring mechanism reacting between said handle and said rear segment normally maintains the cam latch in its latched position, said cam latch comprising a downwardly and rearwardly inclined surface constituting said cam face which moves said cam latch upwardly to unlocked position when said cam face is engaged by said projecting tube during telescoping movement.

11. The vehicle of claim 10 wherein a stop surface element limits movement of said front frame segment to align said slots in said projecting and receiving tubes.

\* \* \* \* \*

UNITED STATES PATENT AND TRADEMARK OFFICE
CERTIFICATE OF CORRECTION

PATENT NO. : 6,273,206 B1            Page 1 of 1
DATED : August 14, 2001
INVENTOR(S) : Allen Bussinger It is certified that error appears in the above-identified patent and that said Letters Patent is hereby corrected as shown below:

<u>Column 3,</u>
Line 17, after "45." insert -- Spring 50 normally maintains the lever 45 in the upright position shown in the various figures. --

Signed and Sealed this

Thirtieth Day of April, 2002

Attest:

JAMES E. ROGAN
*Attesting Officer*      *Director of the United States Patent and Trademark Office*